J. B. SMITH.
COFFEE-POT.
No. 188,080. Patented March 6, 1877.
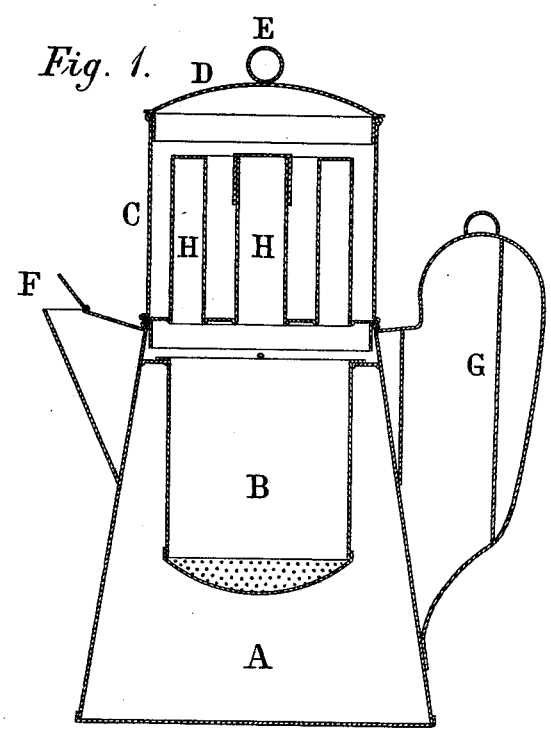
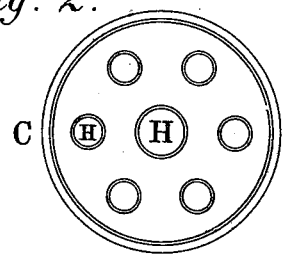

UNITED STATES PATENT OFFICE.

JOHN B. SMITH, OF MILWAUKEE, WISCONSIN.

IMPROVEMENT IN COFFEE-POTS.

Specification forming part of Letters Patent No. 188,080, dated March 6, 1877; application filed September 12, 1874.

*To all whom it may concern:*

Be it known that I, JOHN B. SMITH, of Milwaukee, in the county of Milwaukee, in the State of Wisconsin, have invented certain Improvements in Coffee-Pots, of which the following is a specification:

My invention is for the purpose of making good coffee, and is accomplished by making a coffee-pot with a receptacle for making the coffee the same as those now in use, and placing in the top, hanging down into the pot, a coffee-holder, perforated at the bottom, into which the ground coffee is placed, and then pouring boiling water onto it and filtering it through the coffee; then place on the top of the coffee-pot a condenser, with hollow tubes passing up into it, and filling the condenser with cold water; and as the steam rises, it passes through the percolator and the coffee up into the condenser and is condensed, and the condensed water falling back into the coffee in the percolator, and passing to the coffee, and passing through the coffee to the pot below.

Figure 1 is a vertical sectional view of my invention, and Fig. 2 is a view of the bottom of the condenser.

A is the coffee-pot proper; B, the percolator, into which the ground coffee is placed; C, the condenser; D, the cover; E, the center handle of the cover; F, the coffee-pot spout; G, the handle of the coffee-pot; H, tubes in the condenser, the middle tube being closed by a removable cap.

This coffee-pot is easily handled. Put the ground coffee into the percolator B; then pour on as much boiling water as is wanted for coffee; then place the condenser on the top of the pot, and pour into it cold water enough to fill it nearly to the top of the tubes, and put on the cover and set the coffee-pot on the stove and let it boil; and when it has boiled enough, take off the condenser and take out the percolator, and take the cover from the top of the condenser and put it on the top of the coffee-pot, and it is ready for the table; or you may, if you choose, dispense with the percolator, and put the coffee directly into the coffee-pot, and then put on the condenser and treat it as before. The center tube may be made open at the top, with a cover on it; and it may be opened and the water poured through it onto coffee in the percolator, and all of the aroma of the coffee kept in the coffee-pot.

I claim as my invention—

A coffee-pot with condenser C and tubes H in the same, the middle tube being closed by a removable cap, and cover, D, all in combination, substantially as described.

JOHN B. SMITH.

Witnesses:
   G. B. SEAMAN,
   GEO. A. HANOFORD.